(12) United States Patent
Maniwa et al.

(10) Patent No.: US 8,122,607 B2
(45) Date of Patent: Feb. 28, 2012

(54) ELECTRIC SHEARS

(75) Inventors: Yoshihiro Maniwa, Tokyo (JP); Syuichi Ishii, Tokyo (JP)

(73) Assignee: MAX Co., Ltd., Tokyo (JP)

( * ) Notice: Subject to any disclaimer, the term of this patent is extended or adjusted under 35 U.S.C. 154(b) by 477 days.

(21) Appl. No.: 12/373,991

(22) PCT Filed: Jul. 17, 2007

(86) PCT No.: PCT/JP2007/064062
§ 371 (c)(1),
(2), (4) Date: Jan. 15, 2009

(87) PCT Pub. No.: WO2008/010476
PCT Pub. Date: Jan. 24, 2008

(65) Prior Publication Data
US 2009/0241351 A1 Oct. 1, 2009

(30) Foreign Application Priority Data
Jul. 20, 2006 (JP) .................................. 2006-197860

(51) Int. Cl.
*B26B 15/00* (2006.01)

(52) U.S. Cl. .......................................... 30/228; 30/249
(58) Field of Classification Search .................... 30/228, 30/249, 216, 210, 180; 173/170; 73/862.21; 81/57.42, 301; 254/424, 425, DIG. 1; 72/454, 72/21.3

See application file for complete search history.

(56) References Cited

U.S. PATENT DOCUMENTS

| 3,178,816 | A | * | 4/1965 | Schmid | 30/228 |
| 3,536,976 | A | * | 10/1970 | Weidauer et al. | 318/443 |
| 4,275,521 | A | * | 6/1981 | Gerstenberger et al. | 42/84 |
| 4,543,718 | A | * | 10/1985 | Duescher | 30/124 |
| 5,002,135 | A |   | 3/1991 | Pellenc | |
| 5,365,155 | A | * | 11/1994 | Zimmermann | 318/268 |
| 5,867,909 | A | * | 2/1999 | Jeltsch et al. | 30/228 |
| 7,320,368 | B2 | * | 1/2008 | Watanabe | 173/48 |
| 2005/0248320 | A1 | * | 11/2005 | Denning | 320/141 |

FOREIGN PATENT DOCUMENTS

| DE | 198 49 976 A1 | 5/1999 |
| EP | 0 803 187 A2 | 10/1997 |
| EP | 1 574 125 A1 | 9/2005 |
| JP | 63-281680 | 11/1988 |
| JP | 10-33850 | 2/1998 |
| JP | 11-128561 | 5/1999 |

* cited by examiner

Primary Examiner — Ghassem Alie
(74) Attorney, Agent, or Firm — Drinker Biddle & Reath LLP

(57) ABSTRACT

An electric shears includes a trigger operable to be pulled, a motor which rotates in accordance with a pulling operation of the trigger, a screw shaft which rotates interlockingly with the motor, a nut which is screwed onto the screw shaft and is slidable with respect to the screw shaft in accordance with a rotation of the screw shaft, a fixed blade, a movable blade which is coupled to the nut and is movable with respect to the fixed blade, a detector which detects a pulled position of the trigger, and a controller which controls a rotation of the motor based on the pulled position of the trigger detected by the detector.

9 Claims, 9 Drawing Sheets

ELECTRIC SHEARS

TECHNICAL FIELD

The present invention relates to electric shears. More specifically, the present invention relates to electric shears for use in operations such as pruning in gardening, harvesting in fruit cultivation, and cutting wires, thin plates, cardboards or ropes.

BACKGROUND ART

Electric shears have been proposed to save labor in, for example, pruning garden trees in which a shears is manually opened and closed (see, e.g., JP 63-281680 A). The electric shears has a fixed blade and a movable blade. A cutting operation is performed by moving the movable blade with respect to the fixed blade. The movable blade is moved by a link connected to a nut that is moved back and forth in accordance with a rotation of a screw shaft. A trigger is attached to the nut. The screw shaft is rotated by a motor that is actuated by pulling the trigger, whereby the movement of the movable blade is made to interlock with the pulling operation the trigger.

Accordingly, in the electric shears described above, the moving amount of the movable blade can be controlled based on a pulled position of the trigger. However, because a finger needs to be moved in accordance with the movement of the trigger, which moves back and forth together with the movement of the nut, the operational feeling has been unnatural. In addition, because the trigger is moved along with the movement of the nut, an opening corresponding to the movement of the trigger needs to be formed in a cover. However, there has been a fear that dust or sand may enter the opening during the operation and a machine life may be reduced.

DISCLOSURE OF THE INVENTION

One or more embodiments of the present invention provide an electric shears having excellent operability in which operational feeling of a trigger can be set optionally.

According to one or more embodiments of the present invention, an electric shears includes a trigger operable to be pulled, a motor which rotates in accordance with a pulling operation of the trigger, a screw shaft which rotates interlockingly with the motor, a nut which is screwed onto the screw shaft and is slidable with respect to the screw shaft in accordance with a rotation of the screw shaft, a fixed blade, a movable blade which is coupled to the nut and is movable with respect to the fixed blade, a detector which detects a pulled position of the trigger, and a controller which controls a rotation of the motor based on the pulled position of the trigger detected by the detector. The controller controls a position of the movable blade with respect to the fixed blade by controlling the rotation of the motor.

According to one or more embodiments of the present invention, the motor may be a brushless motor.

According to one or more embodiments of the present invention, the electric shears may further include a sensor which detects a position of the nut. In this case, the controller can control the rotation of the motor based on the position of the nut detected by the sensor.

According to one or more embodiments of the present invention, the electric shears may further include a switch which sets a rate of change in a position of the movable blade with respect to the pulled position of the trigger. In this case, the controller can control the position of the movable blade based on the rate of change set by the switch.

According to one or more embodiments of the present invention, the switch is operable to set the rate of change in the position of the movable blade with respect to the pulled position of the trigger to be constant.

According to one or more embodiments of the present invention, the switch is operable to set the rate of change in the position of the movable blade such that the rate of change in the position of the movable blade with respect to the pulled position of the trigger decreases as the trigger is pulled.

According to one or more embodiments of the present invention, the switch is operable to set the rate of change in the position of the movable blade such that the rate of change in the position of the movable blade with respect to the pulled position of the trigger increases as the trigger is pulled.

According to one or more embodiments of the invention, the electric shears may further include a biasing member which biases the trigger in a direction opposite to a direction of the pulling operation of the trigger, and the trigger may include, at a front end portion thereof, an engaging portion engageable with the nut. In this case, when a power is turned on, the controller can cause the motor to rotate so as to slide the nut until the nut engages with the engaging portion and the trigger moves in a direction of the pulling operation against a biasing force of the biasing member.

According to one or more embodiments of the invention, the detector may be a potentiometer.

Figure 1:
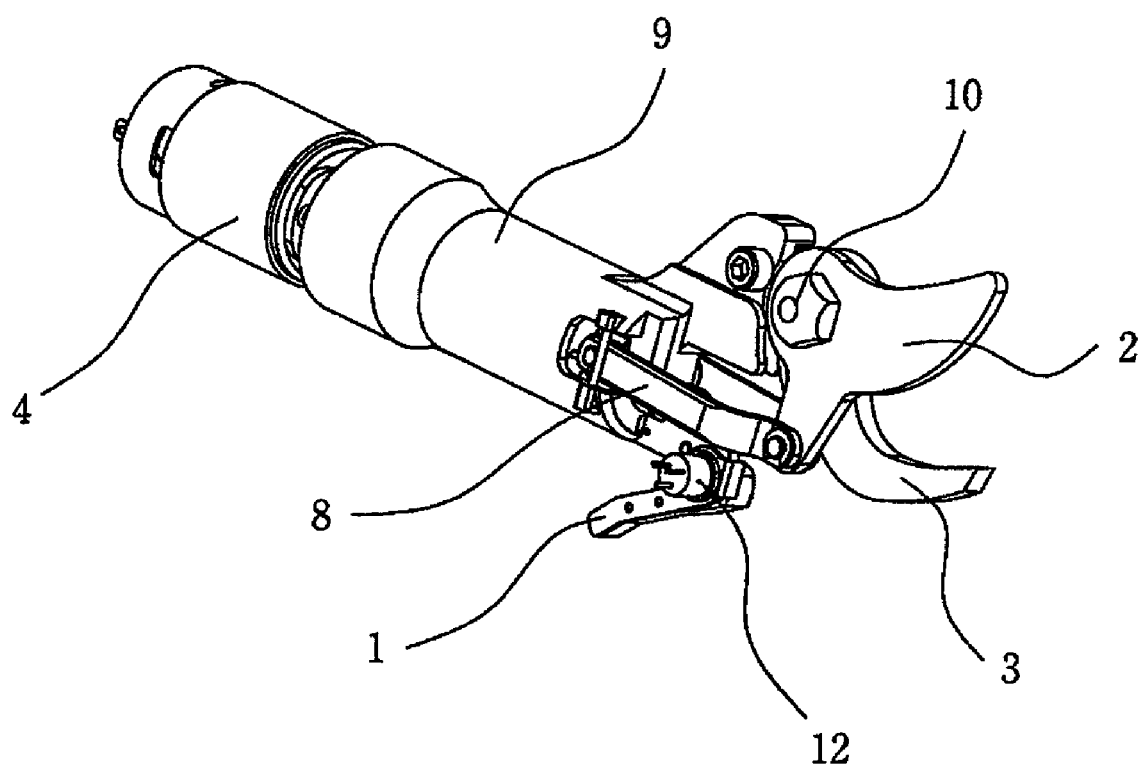
FIG. 1 is a perspective view of an electric shears according to an embodiment of the invention.

EXPLANATION OF REFERENCE NUMERALS 1 trigger
2 movable blade
3 fixed blade
4 motor
6 screw shaft
7 nut
12 detection means (potentiometer)
15 controller

BEST MODE FOR CARRYING OUT THE INVENTION

Hereinafter, embodiments of the present invention will be described with reference to the drawings.

Figure 2:
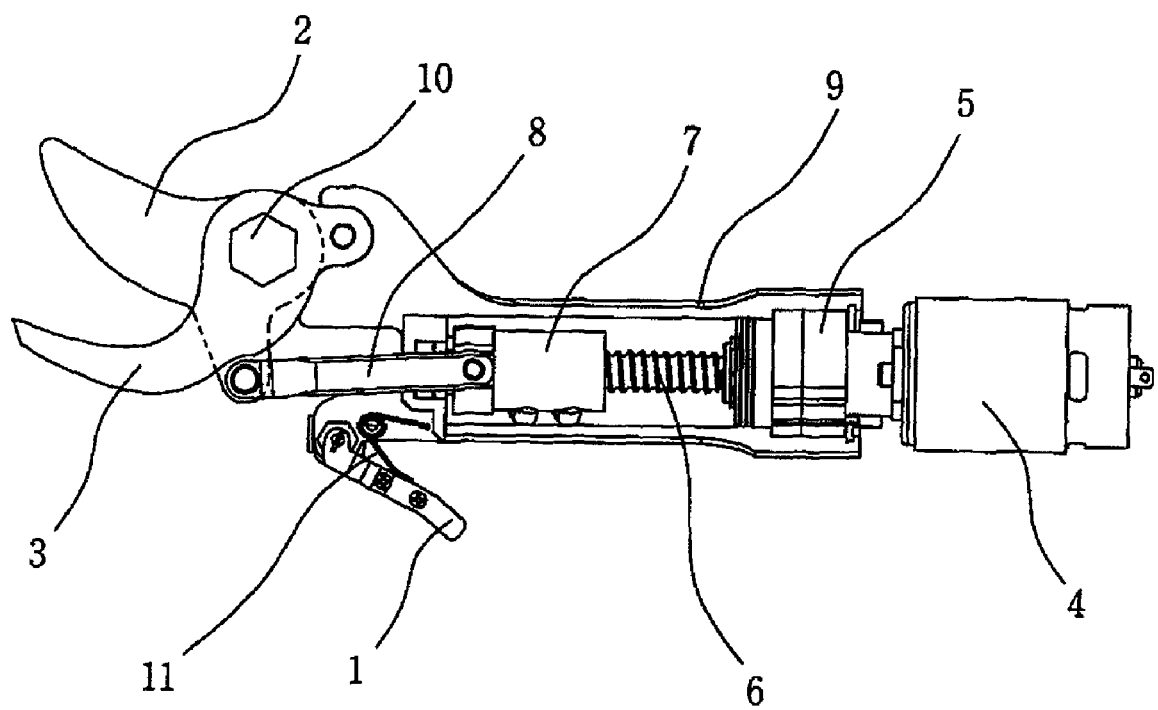
FIG. 2 is a side view illustrating an internal structure of the electric shears.

FIG. 1 illustrates a perspective view of a state in which a cover (not shown) is removed from an electric shears according to an embodiment of the invention. The electric shears is configured to move a movable blade 2 by actuating a motor 4 in accordance with a pulling operation of a trigger 1, thereby closing the movable blade 2 and a fixed blade 3 to cut an object to be cut. As illustrated in FIG. 2, the motor 4 rotates a screw shaft 6 via a speed-reducing mechanism 5 having a plurality of gears. The nut 7 is screwed onto the screw shaft 6, and slides with respect to the screw shaft 6 by rotating the screw shaft 6. A link 8 is coupled to the nut 7 at one end thereof, and is coupled to the movable blade 2 at the other end thereof. With the above configuration, when the motor 4 is forwardly and reversely rotated, the nut 7 moves back and forth inside a cylindrical frame 9, the movable blade 2 rotates up and down around a pivot 10, which is fixed to the fixed blade 3, interlockingly with the back and forth movement of the nut 7, whereby the movable blade 2 and the fixed blade 3 are opened and closed.

Detection means 12 is attached to a rotating shaft of the trigger 1 to detect a pulled position of the trigger 1. In the embodiment, the detection means 12 is a potentiometer which converts a mechanical displacement, such as an angular displacement, into an electric signal (voltage). The detection means 12 electrically detects the pulled position of the trigger 1. A controller 15 controls the movement of the movable blade 2 based on the pulled position of the trigger 1 detected by the detection means 12. Therefore, it is unnecessary to form an opening portion, for allowing the trigger 1 to move in accordance with the movement of the nut 7, in the cover. Consequently, design freedom of configuration of electric shears can be expanded.

Figure 3:
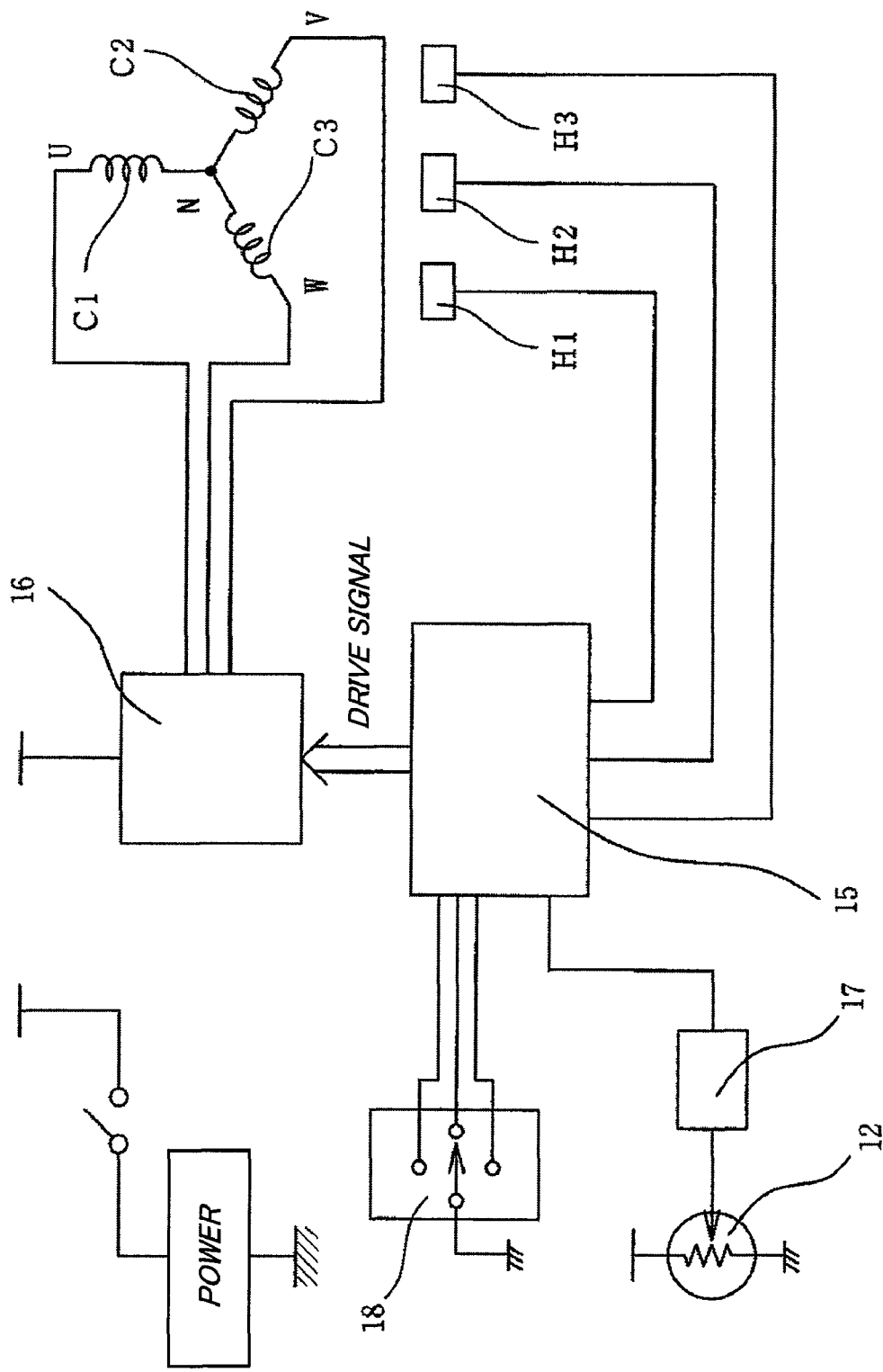
FIG. 3 is a block diagram illustrating an electrical configuration of the electric shears.

In the embodiment, the motor 4 is a brushless motor. As illustrated in the block diagram of FIG. 3, Hall sensors H1-H3 detect rotational positions of a rotor in the brushless motor. Based on the rotational positions of the rotor detected by the respective Hall sensors H1-H3, the controller 15 outputs drive signals to an inverter 16 to supply drive currents to stator windings C1-C3 of U-phase, V-phase and W-phase. Attraction and repulsion are repeated between a permanent magnet provided in the rotor and magnetic fields generated through the stator windings C1-C3 by the drive currents, whereby the rotor is rotated.

The controller 15 can monitor the rotating direction and the number of rotations of the rotor based on detection results by the Hall sensors H1-H3.

That is, the rotation amount and the rotating direction of the motor 4 can easily be determined when the brushless motor is used, so that the movement of the movable blade 2 can easily be controlled in accordance with the pulled position of the trigger 1.

A detection signal is input to the controller 15 from the potentiometer 12. This detection signal is a signal obtained by converting the pulled position of the trigger 1 into a voltage, and is input to the controller 15 after converted into a digital signal by an AD converter 17. Accordingly, the controller 15 can digitally monitor the pulled position of the trigger 1. The controller 15 is programmed to be able to control the movement of the movable blade 2 by controlling the rotation of the motor 4 so as to correspond to the pulled position of the trigger 1. For example, the controller 15 counts the number of rotations of the motor 4 using a counter, and controls the movement of the movable blade 2 such that a value counted by the counter corresponds to a rotational position of the movable blade 2.

The controller 15 performs a control based on a control program stored in an internal memory of the controller 15. For example, as illustrated in the graph (FIG. 4) showing the relationship between the angle of the trigger 1 and the operating position of the movable blade 2, there may be set a first control, in which a rate of change in the angle of the movable blade 2 with respect to the angle of the trigger 1 detected by the potentiometer 12 is set to be constant (see the line a in the graph), a second control, in which the movement of the movable blade 2 can be finely operated by the trigger 1 as the movable blade 2 and the fixed blade 3 become closed (see the line b in the graph), or a third control, in which the movement of the movable blade 2 is made small in an initial stage of the pulling operation of the trigger 1 and the movable blade 2 is immediately operated to the end when the trigger 1 is sufficiently pulled (see the line c in the graph).

According to the first control, free operational feeling can be given to a user. Thus, the user can perform an operation as if hand-powered shears were used. According to the second control, in a case in which an object to be cut is small, a cutting operation can be performed cautiously because the movement of the movable blade 2 can be finely operated by the trigger 1 when it is in an actual cutting state just before closing the movable blade 2 and the fixed blade 3. According to the third control, in a case in which something other than the object to be cut (e.g., an user's finger or a metallic bar) is accidentally inserted between the movable blade 2 and the fixed blade 3, it allows the non-cutting object to be removed by immediately stopping the movement of the movable blade 2. Thus, it is possible to ensure safety.

Such settings of control conditions may be implemented by a select switch 18.

Next, an operation of the electric shears under the first control will be described with reference to the flowchart of FIG. 5 and FIGS. 6A to 8C.

Figure 6A:
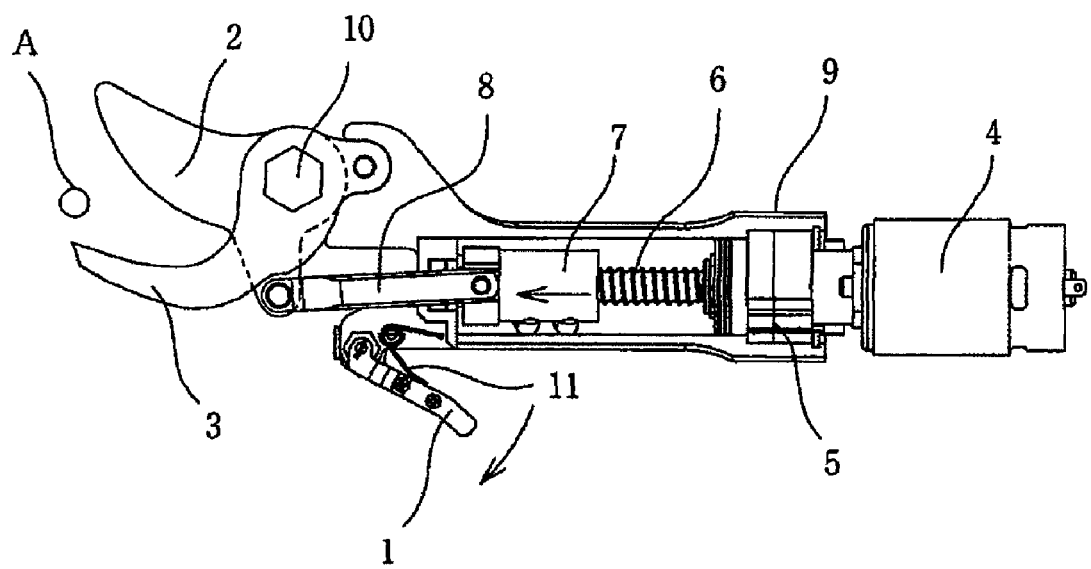
FIG. 6A is an explanatory view illustrating an operating mode of the electric shears.

As illustrated in FIG. 6A, when the trigger 1 is not being pulled, the trigger 1 is biased in a clockwise direction by a biasing member 11 (a spring in the embodiment), and is in a state (a rest position) in which it is brought into contact with a not-shown stopper and is prevented from rotating.

When a power is turned on, the trigger 1 is in the rest position so that a value represented by an output signal of the potentiometer 12 is zero. The nut 7 is at a front position in the frame 9, and the movable blade 2 is in a maximally upwardly rotated state via the link 8. That is, the fixed blade 3 and the movable blade 2 are opened to the full extent. In this state, the electric shears is moved to an object-to-be cut A, and the trigger 1 is pulled (Step ST1).

When the trigger 1 is drawn, the potentiometer 1 detects the pulled position of the trigger 1, and the detection signal indicating the pulled position of the trigger 1 is input to the controller 15. The controller 15 reads the pulled position (angle) of the trigger 1 based on the detection signal from the potentiometer 12 (Step ST2). The controller 15 causes the motor 4 to forwardly rotate so as to correspond to the pulled position to backwardly slide the nut 7 (Step ST3).

Figure 4:
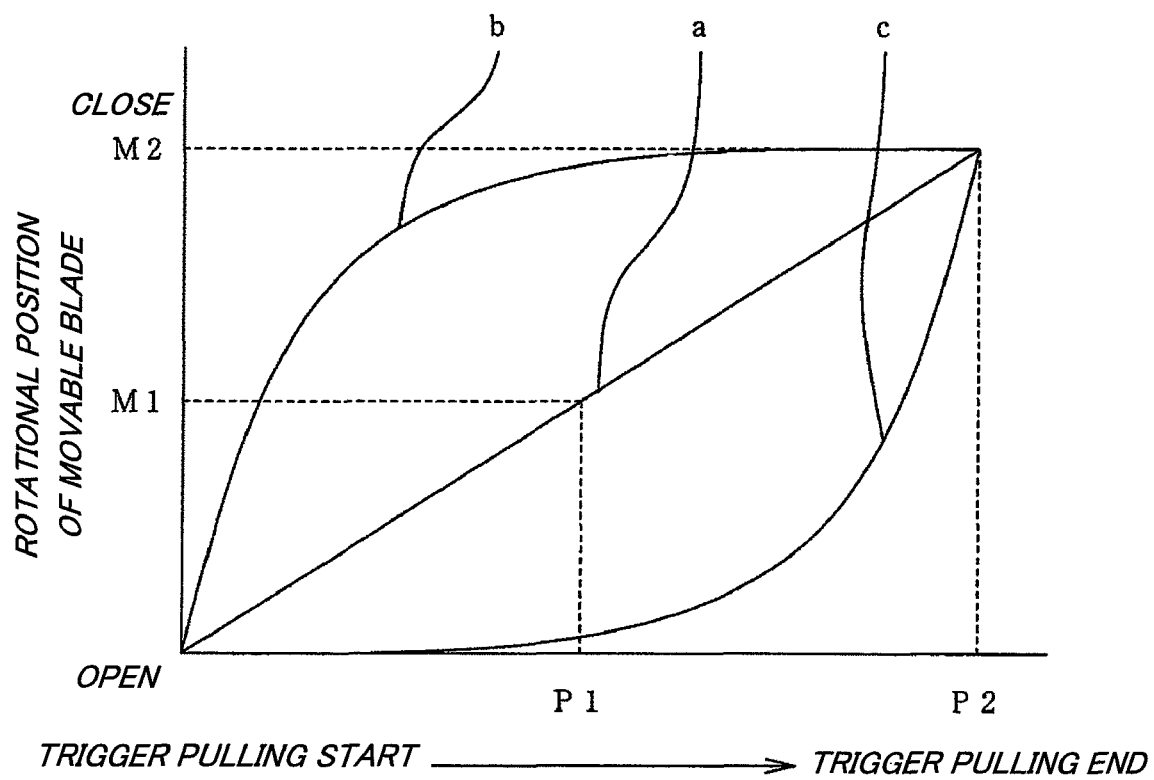
FIG. 4 is a graph illustrating a relationship between an angle of a trigger and an operating position of a movable blade.
Figure 5:
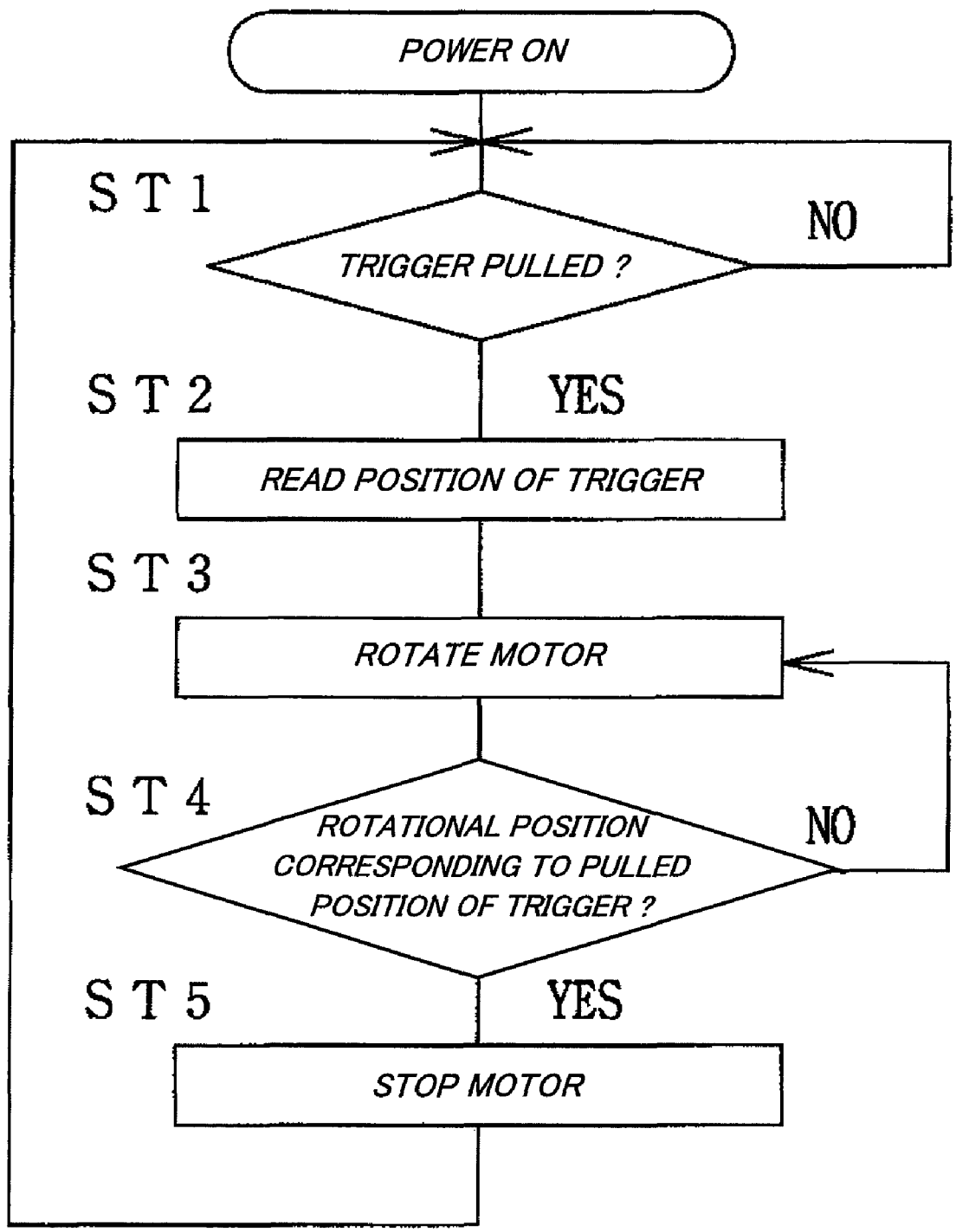
FIG. 5 is a flowchart of an operation of the electric shears.
Figure 6B:
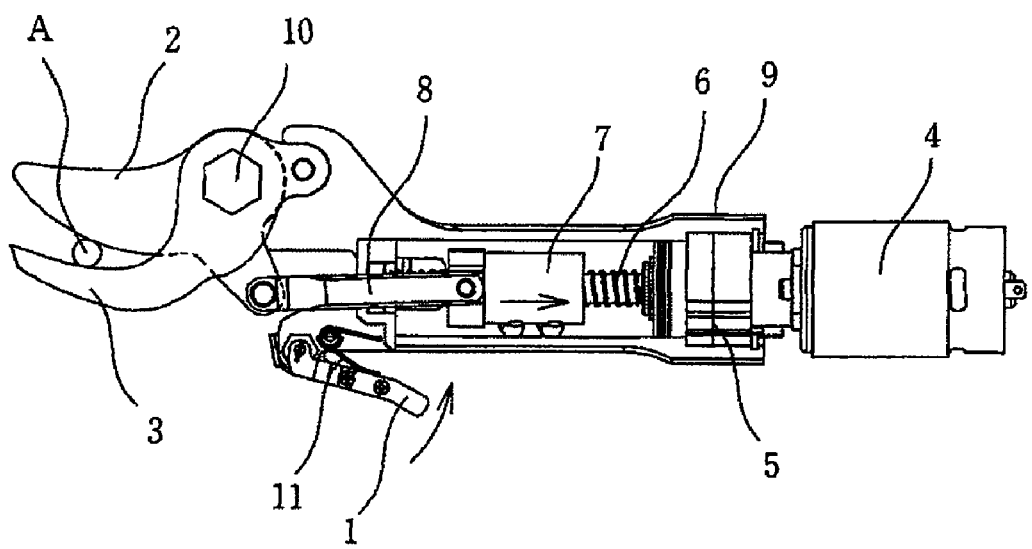
FIG. 6B is an explanatory view illustrating another operating mode of the electric shears.

In a state in which the trigger 1 is pulled partway as illustrated in FIG. 6B, if the angle of the trigger 1 detected by the potentiometer 12 is, e.g., P1 shown in FIG. 4, the rotational position of the movable blade 2 corresponding to the angle P1 of the trigger 1 is M1. Accordingly, the controller 15 causes the motor to continue to rotate until the rotational position of the movable blade 2 reaches M1. When the rotational position of the movable blade 2 reaches M1 (Step ST4), the controller 15 stops the rotation of the motor 4 (Step ST5), and returns to Step ST1 to continue to determine whether the trigger 1 is pulled or not.

Figure 6C:
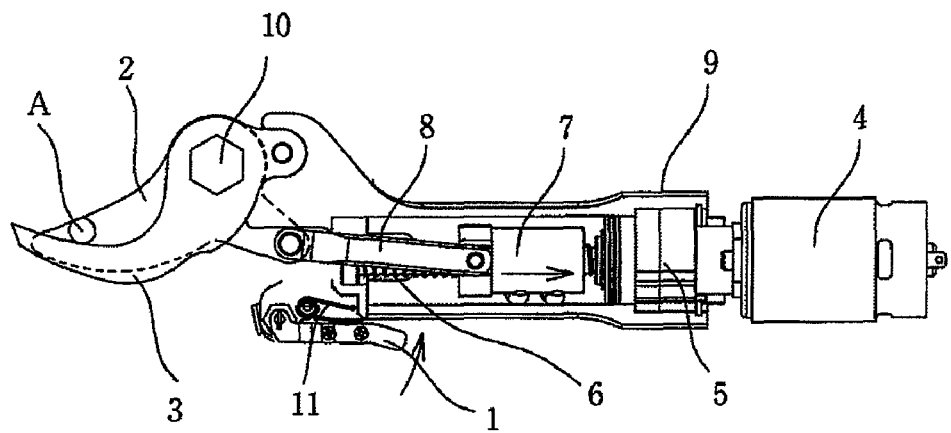
FIG. 6C is an explanatory view illustrating yet another operating mode of the electric shears.

In a state in which the trigger 1 is further pulled as illustrated in FIG. 6C, if the angle of the trigger 1 detected by the potentiometer 12 is P2 shown in FIG. 4, the rotational position of the movable blade 2 corresponding to the angle P2 of the trigger 1 is M2. Accordingly, the controller 15 causes the motor 4 to further rotate to move the nut 7 more backwardly. As a result, the link 8 is backwardly pulled in accordance with the movement of the nut 7, and the rotational position of the movable blade 2 reaches M2. That is, the movable blade 2 is maximally downwardly rotated around the pivot 10, whereby the fixed blade 3 and the movable blade 2 are completely closed, and the object-to-be-cut A is reliably cut.

While the operation of the electric shears has been described in a case of performing the first control in which the movable blade 2 is operated in a linear relationship with respect to the pulled position of the trigger 1, it is similar in the second control, in which the movable blade 2 is largely moved in the initial stage of the pulling operation of the trigger 1, and also in the third control, in which the movable blade 2 is largely moved in the later stage of the pulling operation of the trigger 1, in that the pulled position of the trigger 1 is detected by the potentiometer 12 and the controller 15 determines the pulled position of the trigger 1 detected by the potentiometer 12 to control the amount and the direction of the rotation of the motor 4 such that the movable blade 2 is rotated to a given position. Accordingly, the rotation of the movable blade 2 can be stopped at an optional position, whereby the operability can be improved.

Figure 7:
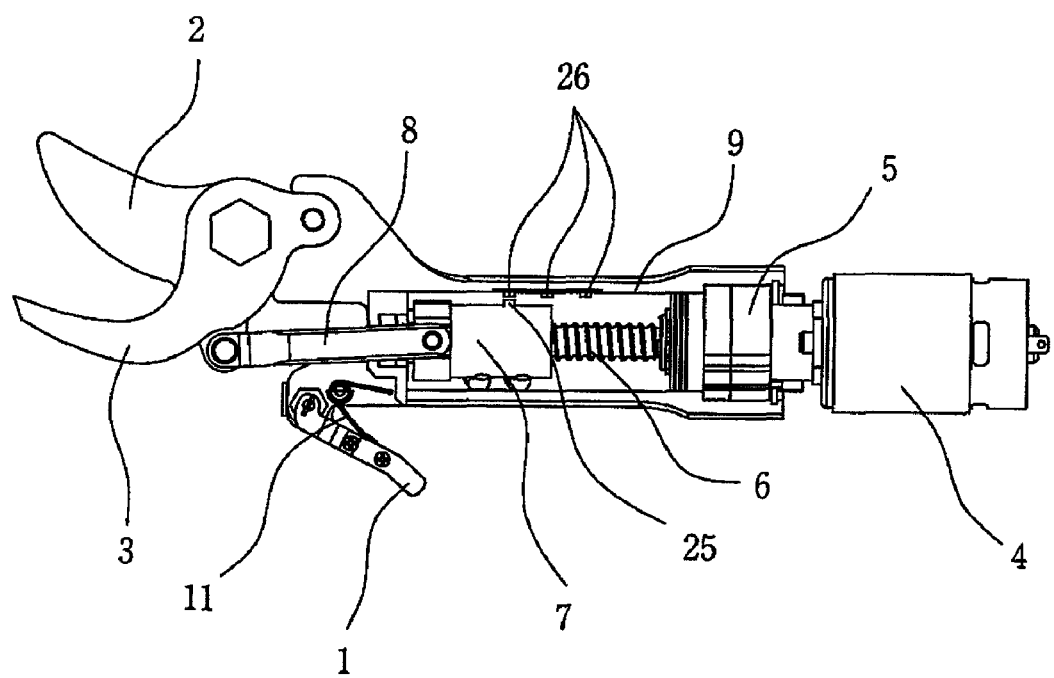
FIG. 7 is a side view illustrating an internal structure of an electric shears according to another embodiment of the invention.

Further, while the direction and the amount of rotation of the screw shaft 6 are controlled using the brushless motor in the electric shears according to the embodiment, the motor 4 is not limited to brushless motors. For example, as illustrated in FIG. 7, at least one magnet 25 may be disposed on an upper surface of the nut 7, and a plurality of Hall sensors 26 may be arranged on an inner wall surface of the frame 9 at positions corresponding to the moving track of the magnet 25. In this case, regardless of kinds of the motor 4, the controller 15 can determine the position of the nut 7 based on detection signals from the Hall sensors 26 to control an operation of the motor 4. Thus, the rotational position of the movable blade 2 can easily be controlled in accordance with the pulling operation of the trigger 1.

Generally, like hand-powered shears, electric shears are stored in a state in which the movable blade 2 and the fixed blade 3 are closed at least to some extent when not in use, and the movable blade 2 is moved such that the movable blade 2 and the fixed blade 3 are opened when in use.

When the electric shears is not in use (i.e., when the trigger 1 is not pulled), the trigger 1 is biased by the biasing member 11 and is at the rest position as described above. However, because the electric shears is in a state in which the movable blade 2 and the fixed blade 3 are closed to some extent, the pulled position of the trigger 1 and the rotational position of the movable blade 2 are not in the correspondence relationship as illustrated in the graph of FIG. 4. That is, the nut 7 is not positioned at a front end portion of the screw shaft 6. Therefore, if the trigger 1 is pulled in this state to move the movable blade 2 by rotating the motor 4 to an angle corresponding to the pulled position of the trigger 1, the backward movement of the nut 7 becomes locked. Accordingly, when the power is turned on, it is necessary to ensure the consistency between the position of the nut 7 and the pulled position of the trigger 1.

Figure 8A:
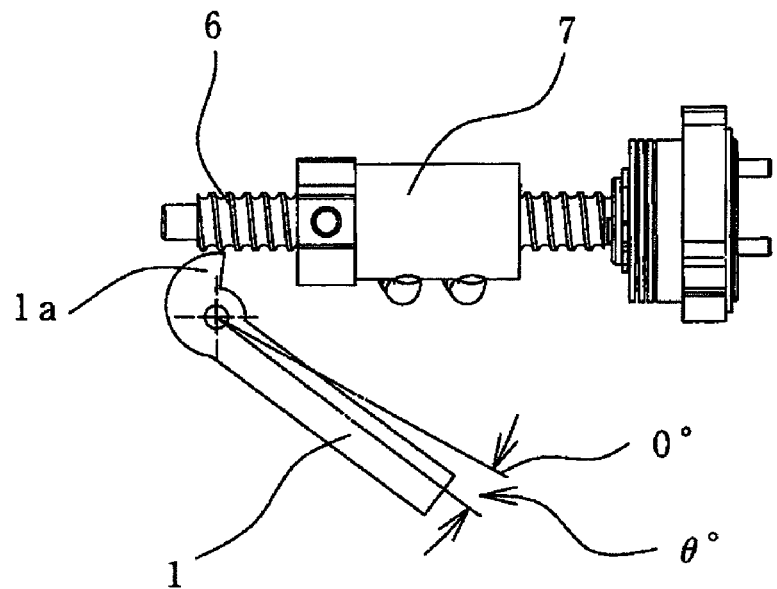
FIG. 8A is an explanatory view illustrating an operation of the electric shears when ensuring positional consistency between the trigger and a nut.
Figure 8B:
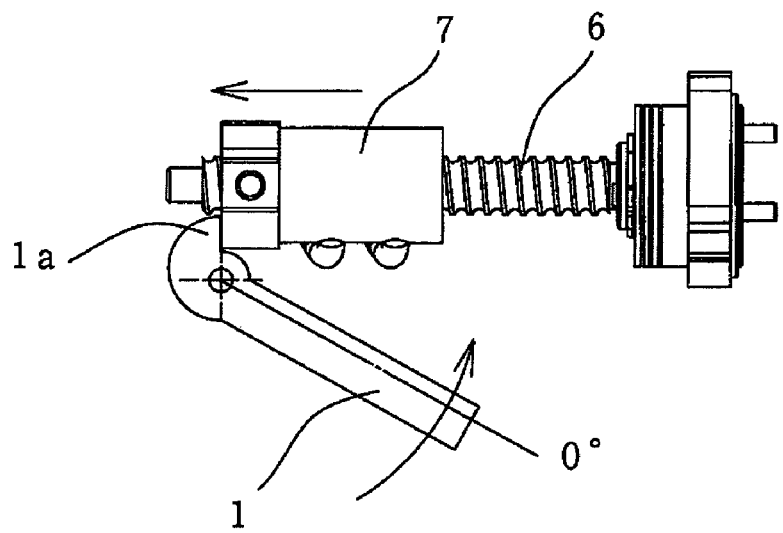
FIG. 8B is another explanatory view illustrating the operation of the electric shears when ensuring the positional consistency between the trigger and the nut.

Therefore, according to another embodiment of the invention, as illustrated in FIG. 8A, the rest position of the trigger 1 is set to be slightly minus (e.g. θ°) than 0°. Further, a front end portion of the trigger is formed with an engaging portion 1a which engages with the nut 7. When the power is turned on, the controller 15 causes the motor 4 to reversely rotate to forwardly feed the nut 7, whereby the nut 7 engages with the engaging portion 1a and moves the trigger 1. When the angle of the trigger 1 reaches 0° as illustrated in FIG. 8B (i.e., when the potentiometer 12 detects 0°), the controller 15 stops the motor 4 and recognizes that the pulled position of the trigger 1 is at the origin. In this state, because the nut 7 is placed at the foremost portion on the screw shaft 6, the movable blade 2 is in the maximally opened state.

Figure 8C:
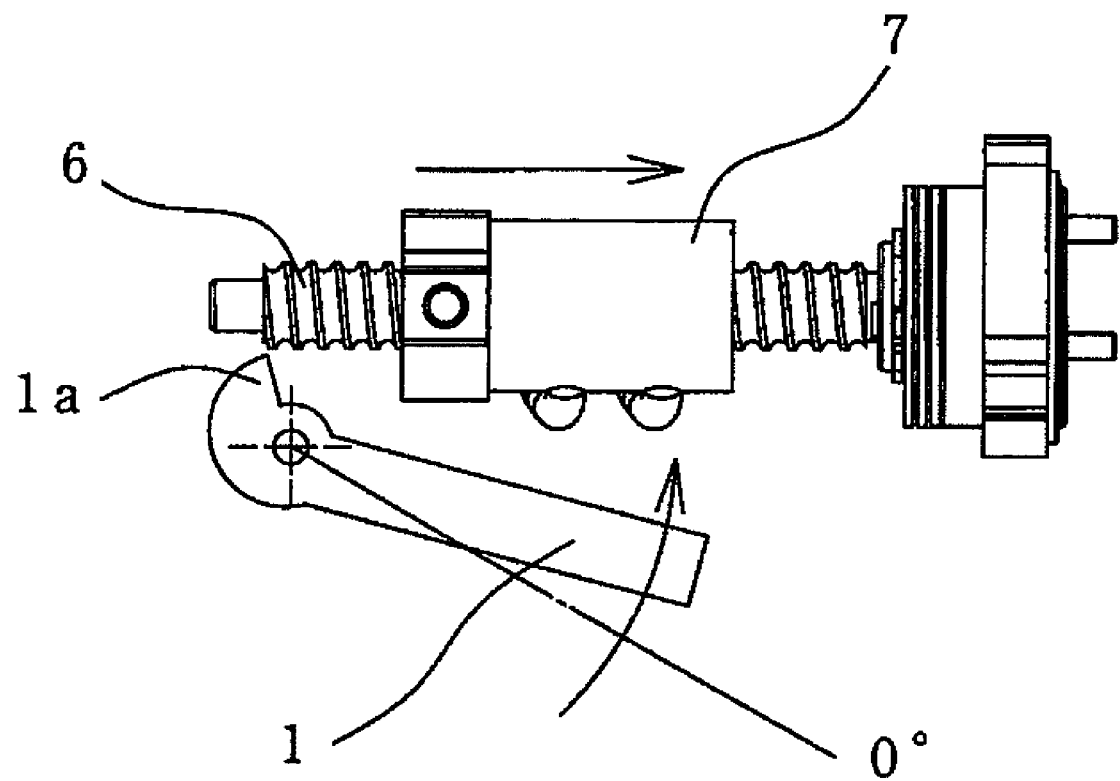
FIG. 8C is yet another explanatory view illustrating the operation of the electric shears when ensuring the positional consistency between the trigger and the nut.

Subsequently, when the trigger 1 is pulled as illustrated in FIG. 8C, the controller 15 causes the motor 4 to rotate based on the detection signal from the potentiometer 12, so that the rotational position of the movable blade 2 can be moved so as to correspond to an angle to which the trigger 1 is pulled.

The configuration for ensuring the consistency between the pulled position of the trigger 1 and the position of the nut 7 is not limited to the configuration described above. For example, a sensor for detecting an initial position of the nut 7 may be provided. In this case, the nut 7 is moved to the initial position by reversely rotating the motor 4 when the power is turned on, and the motor 4 is stopped when this sensor is turned on, whereby the consistency between the pulled position of the trigger 1 and the position of the nut 7 can be ensured.

While the present invention has been described in detail with reference to specific embodiments, it is apparent to those skilled in the art that various changes and modifications can be made therein without departing from the spirit and scope of the present invention.

The present application is based on Japanese Patent Application No. 2006-197860 filed on Jul. 20, 2006, the content of which is incorporated herein by reference.

INDUSTRIAL APPLICABILITY

According to the present invention, there can be provided an electric shears having excellent operability in which operational feeling of a trigger can be set optionally.

The invention claimed is:
1. An electric shears comprising:
a trigger operable to be pulled;
a motor which rotates in accordance with a pulling operation of the trigger;
a screw shaft which rotates interlockingly with the motor;
a nut which is screwed onto the screw shaft and is slidable with respect to the screw shaft in accordance with a rotation of the screw shaft;
a fixed blade;
a movable blade which is coupled to the nut and is movable with respect to the fixed blade;
a detector which detects a pulled position of the trigger, the pulled position of the trigger corresponding to a position of the movable blade with respect to the fixed blade; and
a controller which controls a rotation of the motor based on the pulled position of the trigger detected by the detector,
wherein the controller controls the position of the movable blade with respect to the fixed blade by controlling the rotation of the motor such that the movable blade assumes the position which corresponds to the pulled position of the trigger detected by the detector.
2. The electric shears according to claim 1, wherein said motor comprises a brushless motor.

3. The electric shears according to claim 1, further comprising:
a sensor which detects a position of the nut,
wherein the controller controls the rotation of the motor based on the position of the nut detected by the sensor.

4. The electric shears according to claim 1, further comprising:
a biasing member which biases the trigger in a direction opposite to a direction of the pulling operation of the trigger,
wherein the trigger comprises, at a front end portion thereof, an engaging portion engageable with the nut, and
when a power is turned on, the controller causes the motor to rotate so as to slide the nut until the nut engages with the engaging portion and the trigger moves in a direction of the pulling operation against a biasing force of the biasing member.

5. The electric shears according to claim 1, wherein the detector comprises a potentiometer.

6. An electric shears comprising:
a trigger operable to be pulled;
a motor which rotates in accordance with a pulling operation of the trigger;
a screw shaft which rotates interlockingly with the motor;
a nut which is screwed onto the screw shaft and is slidable with respect to the screw shaft in accordance with a rotation of the screw shaft;
a fixed blade;
a movable blade which is coupled to the nut and is movable with respect to the fixed blade;
a detector which detects a pulled position of the trigger;
a switch which sets a rate of change in a position of the movable blade with respect to the pulled position of the trigger; and
a controller which controls a rotation of the motor based on the pulled position of the trigger detected by the detector,
wherein the controller controls the position of the movable blade with respect to the fixed blade by controlling the rotation of the motor and wherein the controller controls the position of the movable blade based on the rate of change set by the switch.

7. The electric shears according to claim 6, wherein the switch is operable to set the rate of change in the position of the movable blade to be constant.

8. The electric shears according to claim 6, wherein the switch is operable to set the rate of change in the position of the movable blade such that the rate of change in the position of the movable blade decreases as the trigger is pulled.

9. The electric shears according to claim 6, wherein the switch is operable to set the rate of change in the position of the movable blade such that the rate of change in the position of the movable blade increases as the trigger is pulled.

* * * * *